Nov. 30, 1948.  E. J. VOGT  2,455,029
ELECTRICAL CONTROL SYSTEM
Filed Nov. 1, 1944
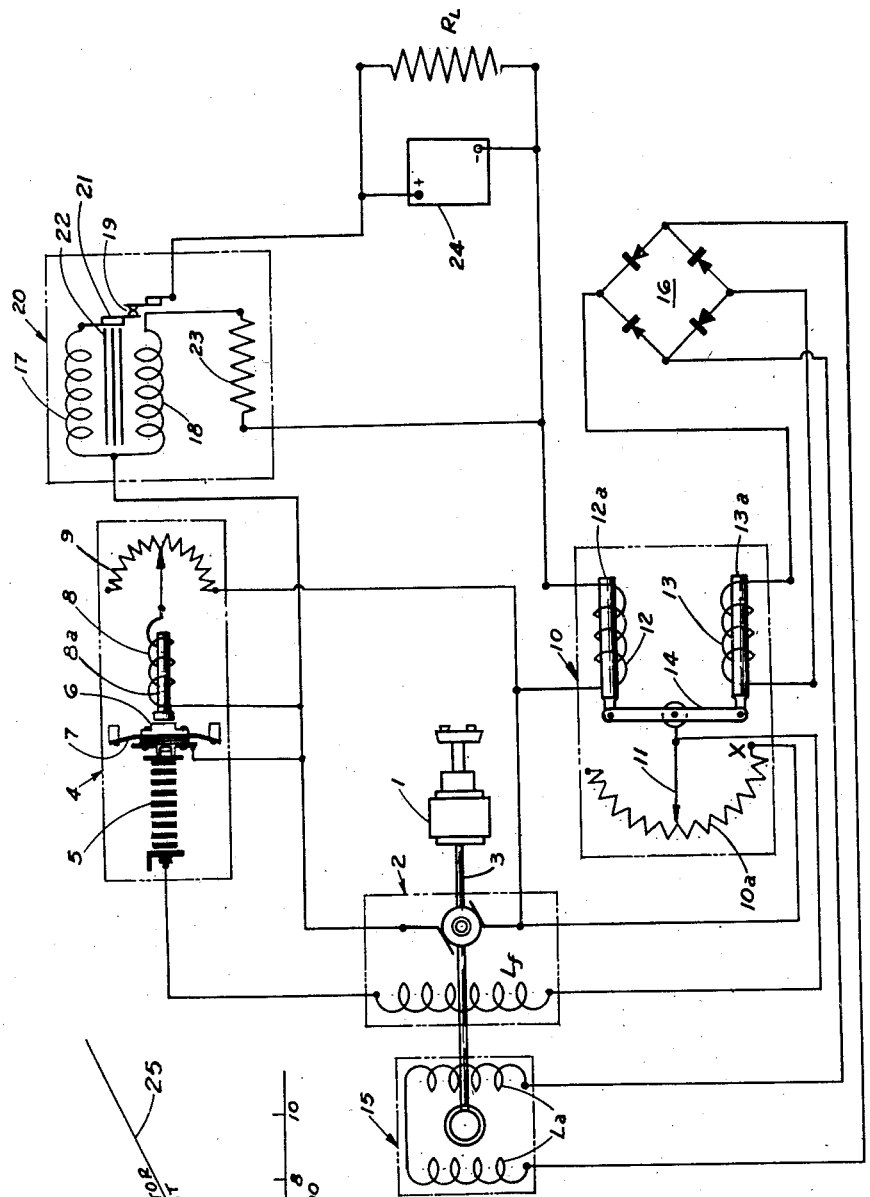
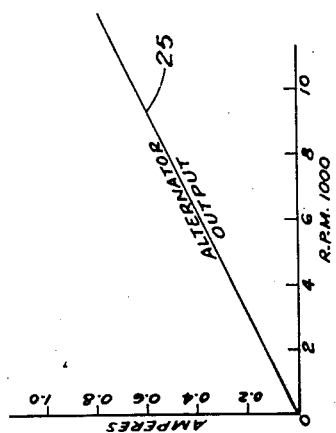
INVENTOR.
ERNEST J. VOGT
BY
Christie & Angus
ATTORNEYS Patented Nov. 30, 1948

2,455,029

UNITED STATES PATENT OFFICE 2,455,029

ELECTRICAL CONTROL SYSTEM

Ernest J. Vogt, Pasadena, Calif., assignor to Aerojet Engineering Corporation, Azusa, Calif., a corporation of Delaware Application November 1, 1944, Serial No. 561,475

2 Claims. (Cl. 322—23)

This invention relates to electrical control systems, and more particularly to means for protecting the prime mover of a generator from overloads in the electrical system.

In general an electrical generator system comprises a prime mover, a generator and a drive shaft between them, by which the prime mover drives the generator. Where the prime mover operates over a wide range of speeds the power output capacity of the prime mover increases with speed; and the allowable operating load on the generator correspondingly varies with the speed. This variation of prime mover power capacity and allowable load makes it much more difficult to protect the system from overloading than if the power and load capacity were constant, as the prime mover has to be protected from overloading at any speed.

According to my invention I make the system operable, over a considerable range of available prime mover speed and power, by the provision of means which tend automatically to decrease the output voltage of the generator when the load current increases, and I provide a related means for increasing the generator output voltage when the speed of the prime mover increases. In this way I provide a correlation between speed and load which permits operation of a load over a considerable range in speed; for as the speed increases the generator is automatically rendered capable of delivering greater load, and vice versa.

For the purpose of maintaining a fairly uniform voltage, throughout the range of operation of any speed and load responsive control system, I preferably provide a voltage regulating device.

When the prime mover speed decreases below a critical point, however, the range of adaptability of the system will be exceeded, and continued application of the load to the generator would stall or otherwise deleteriously affect the prime mover. To guard against this contingency I provide an overload cutout which automatically removes the load from the generator when the generator voltage drops below a critical value.

My invention will be more readily understood by referring to the following description in conjunction with the following drawings wherein:

Fig. 1 represents schematically my invention; wherein all the units are symbolically represented; and Fig. 2 shows graphically the output characteristic with speed of an auxiliary alternator used with the system.

The system shown in the drawing comprises a D. C. generator 2 driven by a prime mover 1 to which it is attached by a shaft 3. A suitable load, represented by the resistance $R_L$, is connected across the output of the generator and across a storage battery 24. For the purpose of maintaining a substantially constant voltage at a given generator speed for varying conditions of load current, there is provided a voltage regulator device 4. This comprises a variable resistor 5, for example, a carbon pile connected in series with the field winding $L_f$ of the D. C. generator. The degree of compression on the carbon pile is varied by the action of an armature 6 and a series of radial dish-shaped leaf springs 7, between the carbon disks and the armature. The position of the armature 6 is controlled by the current through a solenoid coil 8 which magnetizes a core 8a, said coil being connected in series with a rheostat 9 across the output of generator 2. The arrangement is such that any increase in the generator voltage will tend to increase the current through solenoid 8 thereby moving the armature in the direction towards the magnetized core 8a against the tension of springs 7 thereby relieving the pressure on the carbon pile and adding resistance in the field circuit of the generator. This will tend to keep the voltage down to its original level.

The prime mover 1 is of a type which is susceptible to wide variations in speed such as is frequently encountered in aircraft power plants. The prime mover, for example, can be a wind driven propeller or a jet driven wheel, the speed of either of which may vary within a wide range.

According to my arrangement I provide load and speed compensating means adapted to condition the electrical system to variations of both load and speed. I also provide a cutout arrangement adapted to remove the load when the speed of the prime mover drops below a level at which it can safely supply the provided power. This arrangement comprises a rheostat 10a having a movable arm 11 in series with the field winding $L_f$. The arrangement is such that the field winding current is adjusted to compensate for both changes in load and changes in speed. The adjustment for variations in load is created by a solenoid coil 12 in series between the generator and the load in cooperation with a plunger 12a arranged so that an increase of load current through solenoid coil 12 pulls the plunger into the solenoid and rotates a walking beam 14 to move arm 11 towards coil 12. By reason of this arm movement an increase in load current increases resistance 10a and decreases the field winding current, thereby tending to decrease the output voltage of the generator.

The speed responsive system comprises an alternating current generator 15 of a type which utilizes stationary armature coils $L_a$, the rotor having a doughnut type field magnet. This type of revolving field alternator has an operating characteristic such that its output current through a fixed load varies directly with its speed as shown by line 25 in Fig. 2 where the abscissa represents speed in R. P. M. and the ordinate represents current in amperes. The alternator 15 is driven from the same source of power as the main generator 2 by a common shaft. The output from the winding $L_a$ of alternator 15 is impressed on the input terminals of a bridge connected rectifier 16, the output of the rectifier being connected across a solenoid 13 having a plunger 13a corresponding to 12a in solenoid 12. An increase of current through solenoid 13 tends to pull in plunger 13a and rotate arm 11 toward coil 13, removing some of the resistance from the rheostat thereby tending to increase the output voltage of the generator 2, by the same token a decrease of the current through solenoid 13, allows the solenoid 12 to retract its core 12a tending to rotate arm 11 toward coil 12 thereby adding resistance to the rheostat and tending to decrease the output voltage of generator 2. As the current through solenoid 13 will vary in proportion with the speed of the shaft 3, the amount of resistance 10a added or substracted from the circuit of field winding $L_f$ likewise varies with the speed. This produces the desired control of the generator output voltage in accordance with the speed.

There is provided a cutout device 20 to disconnect the load from the generator when the generator output voltage drops below the voltage of the storage battery 24. This comprises a pair of contacts 19 adapted to be opened and closed by the movement of an armature 21, the position of which is determined by the degree of magnetization of a pole piece 22. There are wound around the pole piece two coils 17 and 18. Coil 17 is connected in series with the generator 2, the armature 21, the contacts 19 and the load $R_L$. The other coil 18 is connected across the line in series with a resistor 23 as shown. The coils 17 and 18 produce a magnetizing effect on the core which mutually oppose each other, so that when the voltage of generator 2 exceeds that of battery 24, the current flowing through coils 17 and 18 in the mutually opposed directions do not produce enough magnetization of the core to pull in the armature 21, and consequently contacts 19 remain closed. When, however, the generator voltage drops below the battery voltage the current from the battery flows back through coil 17 and thereby increases the effectiveness of coil 18 in magnetizing the core. This opens contacts 19 and throws the load off the generator so that the load now operates only on the battery 24.

The system operates in the following manner: When the generator 2 is operating at low speeds a current through winding $L_a$ energizes the solenoid coil 13 which is connected to the rectifier at the output of alternator 15, tending to retract the core 13a. The walking beam 14, pivotally secured to the core, moves in the same direction as the core, in this case counterclockwise, changing the position of arm 11 so that the arm comes to rest at the position X on the potentiometer resistance 10a, removing thereby all resistance from the field current through $L_f$. When a load is applied to the generator 2 the solenoid coil 12 is energized, retracting its core 12a which in turn actuates the walking beam 14, causing the arm 11 to move back toward its former position and adding a portion of resistance 10a to the field circuit. The additional resistance reduces the field current through $L_f$ causing a drop in the generator output voltage. During this operation the voltage regulator 4 maintains constant output voltage within the limits of the generator capacity. When the load capacity of the generator is exceeded at any given speed, the potentiometer 10 applies a high resistance in series with field winding $L_f$, causing a reduction in output voltage. This voltage drop causes a drop in load current and reduces the current in coil 12 thus tending to release core 12a and causing the walking beam 14 to actuate the arm 11 in a manner which returns it to position X. When the lowest limit of voltage regulation is attained the reversal of current from the battery 24, which is at this point of a higher voltage than the generator voltage, causes current from the battery to flow back through the coil 17 of the relay 20. Coil 17, bucking coil 18, causes contact points 19 to open, thereby cutting the generator from the circuit.

It will be observed from the foregoing description that I have provided a novel control system adapted to adjust the power output of the generator at all speeds to the load capacity of the prime mover. By the provision of the coil 12 in the load circuit, and the coil 13 having a current responsive to the prime mover speed, I am able to obtain a correlation which allows the generator to supply a load corresponding to the speed of the prime mover. That is, when the prime mover speed increases with a consequent increase in its power supplying capacity, the allowable load on the generator is increased, and vice versa. By the use of this control arrangement the overload relay only operates when the generator becomes overloaded in correspondence with the speed at that time.

The voltage regulating device 4 functions to maintain a substantially constant generator output voltage under changing load conditions, and is effected at all times when the prime mover speed is sufficient to warrant the output voltage thus being maintained. In operation, an increase in the output voltage of the generator due, for example, to an extra light load, will increase the current through solenoid 8 sufficiently to magnetize the fixed core 8a which will tend to attract armature 6, pulling it away from the carbon pile and relieving the tension on a spring 7 pressing against the carbon pile, thereby releasing somewhat the pressure on the carbon pile and increasing the resistance of the field winding circuit. This will tend to reduce the voltage again back to its original value. Conversely, a decrease of the generator output voltage, due, for example, to an extra heavy load, will cause the armature 6 to be released somewhat by the solenoid so that it will push back against the carbon pile under action of its spring 7. The effectiveness of this voltage regulator 4 of maintaining uniform voltage with varying load conditions, is had during normal operation of the prime mover. When, however, the prime mover speed drops considerably, the speed responsive solenoid 13 takes effect, in cooperation with solenoid 12 as determined by the existing load, so that the generator output voltage may actually be caused to drop as explained above in spite of the presence of the voltage regulator 4.

There is accordingly provided in accordance with my invention a generator system adapted to operate over wide ranges of prime mover speed such as is frequently encountered in aircraft power plants and the like. So long as the prime mover speed is maintained at or near a normal operating value, the system will deliver a substantially uniform voltage over a wide range of electrical loads. When, however, the prime mover speed drops to such a level as not to be so well able to handle whatever load is on the system at the time, the voltage will not be maintained, but instead, will drop sufficiently to reduce the power load on the system. Finally, when the speed drops to a dangerously low point in relation to the load on the system the load will be cut off from the generator.

I claim:

1. In a system comprising a generator, an electrical load operated from the generator and a prime mover for driving the generator, apparatus for regulating the generator comprising a solenoid having through it a current proportional to the load current, a plunger operable in said solenoid, a second solenoid having a current through it responsive to the prime mover speed, a second plunger operable by the second solenoid, a field winding associated with the generator, a rheostat in series with the field winding, said rheostat having a movable arm correlated with both of said plungers, such that an increase of current through the first solenoid and a decrease of current through the second solenoid both tend to increase the resistance of the rheostat, and decrease of current through the first solenoid and increase of current through the second solenoid both tend to reduce the resistance of said rheostat.

2. In a system comprising a generator, an electrical load from the generator and a prime mover for the generator, apparatus for regulating the generator output voltage, comprising, a field winding associated with the generator and a rheostat in series with the generator field winding for adding or detracting resistance to the field circuit, said rheostat having a movable contact member, a first solenoid and a second solenoid, each of said solenoids having an arm movable by its energization and both of said arms being connected to the member such that when the respective solenoids are energized the first solenoid tends to move the member in one direction and the second solenoid in the other direction, a speed responsive control comprising an alternating current generator whose speed is responsive to the generator speed, the output of the alternating current generator being connected to the input of a rectifier, the output current from the rectifier energizing said second solenoid whereby the movable arm of said rheostat is moved in one direction with a decrease of rectifier current and in the other direction with an increase of said current, the load current being carried through said first solenoid, whereby the movable arm of said rheostat is moved in said one direction with an increase of load current and in said other direction with a decrease of load current.

ERNEST J. VOGT.

REFERENCES CITED

The following references are of record in the file of this patent:

UNITED STATES PATENTS

| Number | Name | Date |
| --- | --- | --- |
| 1,271,788 | Snee | July 9, 1918 |
| 1,789,145 | Livingston | Jan. 13, 1931 |